Figure 1:
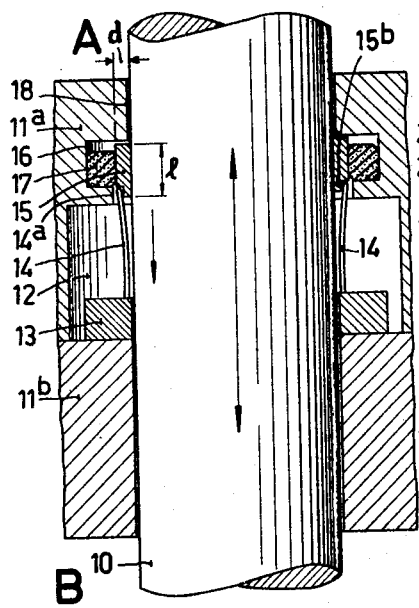

Sept. 22, 1964     H. J. VERBEEK     3,149,846
FLUID-TIGHT SEAL BETWEEN RELATIVELY RECIPROCATING ELEMENTS
Filed March 27, 1961     2 Sheets-Sheet 1

INVENTOR
HENDRIK J. VERBEEK
BY
AGENT

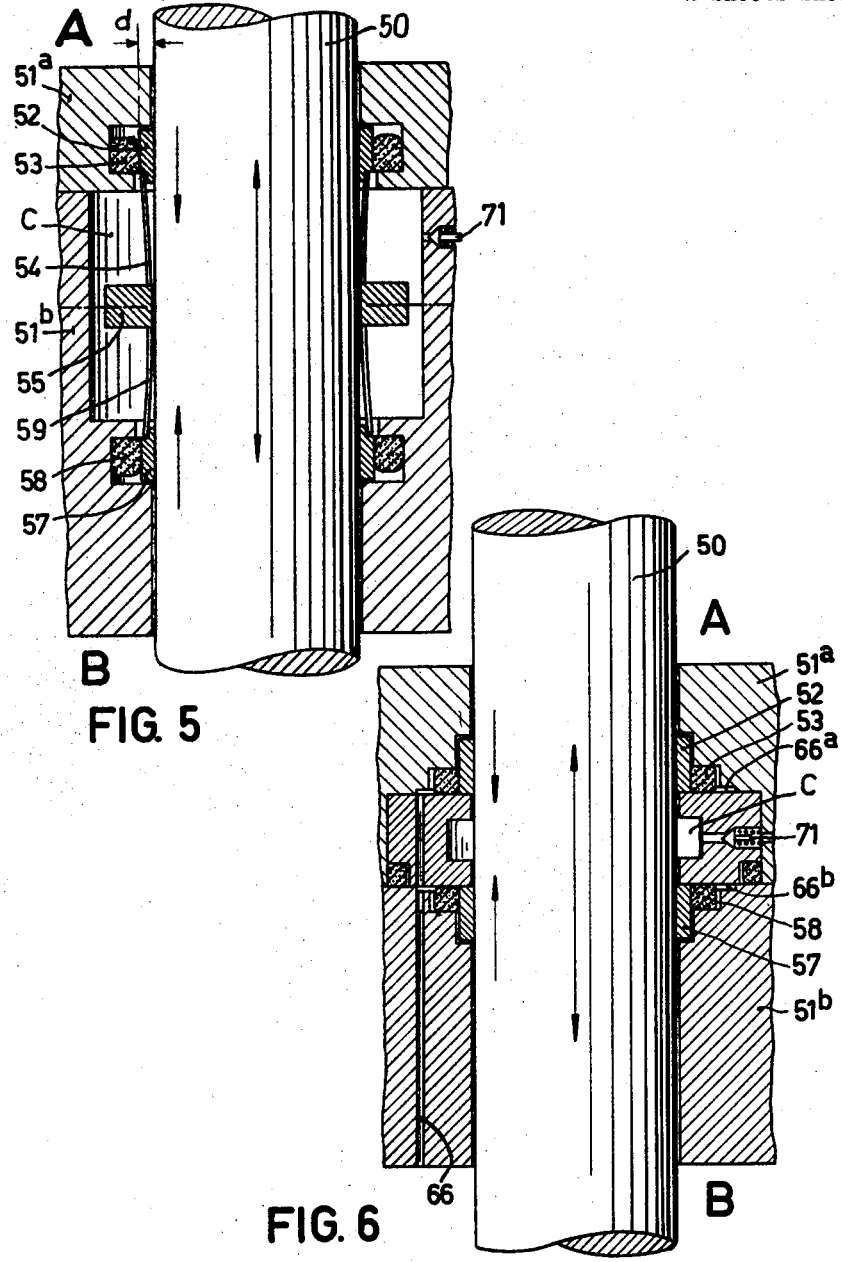

United States Patent Office 3,149,846
Patented Sept. 22, 1964

3,149,846
FLUID-TIGHT SEAL BETWEEN RELATIVELY
RECIPROCATING ELEMENTS
Hendrik Jozef Verbeek, Emmasingel, Eindhoven, Netherlands, assignor to North American Philips Company, Inc., New York, N.Y., a corporation of Delaware
Filed Mar. 27, 1961, Ser. No. 98,446
Claims priority, application Netherlands Apr. 8, 1960
4 Claims. (Cl. 277—27)

The invention relates to a combination of two relatively and axially reciprocating coaxially arranged elements, of which the first supports a sleeve having a substantially rectangular longitudinal section, the length of this section being at least three times its thickness. With its surface facing the second of the said elements this sleeve engages, without play, the surface of the second element, and with its side remote from the second element the sleeve is enclosed in the first element by means of one or more elastic rings in a gastight manner.

Such a combination is known and is employed for sealing a piston in an associated cylinder. With this known application it is the intention thereof to minimize the friction losses.

It has been found that on the basis of this known combination a complex of forces applied in a particular manner to the sleeve of the combination may result in a device by means of which the quantity of transported liquid on one of the said elements between the facing surfaces of the sleeve and of the element moving with respect to this sleeve can be controlled. The transport may even be completely stopped. The said combination may therefore serve, in accordance with the occasional need, for example as a fluidtight closure or else as a fluid-conveying device, operating even against a comparatively high pressure.

The device of this kind set forth is, in accordance with the present invention, characterized in that the sleeve, which may be provided with lining, is made from metal and in that the circumference of this sleeve is exposed, in a zone located asymmetrically to the longitudinal dimension of this sleeve, to a complex of forces directed towards the second element and proportioned so that under the action of a formation of pressure in a fluid between the facing surfaces of the second element and of the second sleeve, this sleeve is elastically deformed against the action of the applied complex of forces directed towards the second element.

Characteristic of the invention is the action of forces applied to the seleeve during the movement of this sleeve relative to the second element. Due to the complex of forces applied asymmetrically to this sleeve the quantity of transported fluid through the gap between the facing surfaces of the sleeve and of the second element may have a value during one direction of movement of the second element relative to the sleeve differing from the value during the other relative direction of movement. This is achieved by a simple means. In the rest position the sleeve should engage, with its surface facing the second element, without play the surface of this second element. Slightly conical sleeves which can be manufactured only with difficulty are not needed. The shape and the material of the sleeve are to be chosen so that during the movement of the sleeve relative to the element concerned the required elastic deformation of the sleeve is possible.

Although the facing surfaces of the sleeve and of the second element engage each other without play, an extremely thin fluid film will always be found between these surfaces due to the inevitable unevennesses thereof, which film has a lubricating effect on these surfaces and thus protects them from excessive wear. This fluid film is to thin that it sticks to the surfaces by adhesion. Hence its presence is unobjectionable in the spaces to be kept free of fluid. However, this extremely thin fluid film should be distinguished from the superimposed complex of forces.

The complex of forces acting upon the sleeve may, for example, be derived from a mechanically operating spring system. In an advantageous embodiment of the combination according to the invention the complex of forces applied asymmetrically to the sleeve is produced by gas or liquid pressure, which is applied across a supply conductor system to that surface of the sleeve which is remote from the second element.

The combination according to the invention may be effectively used in a system in which the sleeve concerned separates two spaces from each other, in one of which is contained a gas under a higher pressure and in the other is contained a gas of lower pressure and a fluid. If in this case the complex of forces acting upon the circumference of the sleeve is applied to this sleeve at a zone which faces the space containing the gas under higher pressure, it is found that during the operation of this system a gastight closure is obtained between the spaces, whereas fluid is conveyed from the lower-pressure space to the higher-pressure space.

In a further embodiment of the system comprising the combination according to the invention the sleeve separates also two spaces from each other, one of which contains a gas under higher pressure and the other of which contains a gas under lower pressure and a fluid, but the complex of forces applied to the periphery of the sleeve acts at a zone which faces the space containing the gas under lower pressure and the fluid. In this case a gastight closure is obtained from the higher-pressure space to the lower-pressure space, whereas no fluid is transported from the lower pressure space to the higher-pressure space. In this case the combination operates as a fluid arrester and as a gastight closure.

In accordance with a further embodiment of the invention the sleeve of the combination in a system separates two spaces from each other, one of which contains a fluid under higher pressure and the other of which contains a fluid under lower pressure. If the complex of forces applied to the periphery of the sleeve is active at a zone of this sleeve which faces the space containing the fluid under higher pressure, the combination operates as a fluid conveying device from the space of the lower fluid pressure to the space of the higher fluid pressure.

In a further embodiment of the system according to the invention provision is made of two coaxially mounted combinations according to the invention being arranged in the axial direction of the combinations distanced from one another. The two sleeves separate, in common, two spaces, of which the first contains a gas under higher pressure than in the second space, while, moreover, the second space contains fluid. Between the facing sides of the combinations of this system provision is made of a third space. If the complexes of forces applied asymmetrically to each of the two sleeves of the two combinations are active on these sleeves in zones which are nearer the third space than the first or the second space, the following conditions are obtained: the sleeve facing the low-pressure side serves as a fluid-conveying member, so that the space between the two sleeves is constantly filled with the fluid. However, the sleeve between the third space and the space of the comparatively high gas pressure serves as a fluid stop for the high-pressure space. Consequently, during the operation of the system a gastight closure between the high-pressure side and the low-pressure side is otbained, while automatically between the two sleeves a fluid-tight closure is formed, which, in the rest position of the system, prevents the high-pressure gas from leaking away to the low-pressure side.

As a matter of fact, other arrangements may be obtained by means of one or more of the combinations.

The combination according to the invention may be employed not only when the sleeve moves back and forth but also when the sleeve is stationary and the other element is moving. Moreover, the sleeve may be used on the inner side of the outward body or else on the outer side of the internal body. The combination according to the invention is particularly suitable for use with an axial movement of rods in sleeves or of pistons in cylinders. As stated above, the sleeve may be provided with lining, for example, of a synthetic substance such as nylon.

The invention will be described more fully with reference to the drawing.

In all embodiments it is supposed that the rod is axially movable in a stationary sleeve. The sleeve is supported from one of the elements of the combination. This element will be termed hereinafter the "sleeve support." The sleeve support thus constitutes one of the coaxial elements adapted to reciprocate relatively to each other, whereas the rod constitutes always the other of these elements. By means of the sleeve associated with the sleeve support the space above the sleeve is separated from the space below the sleeve. In the drawing the structural parts guiding the rod are omitted for the sake of simplicity.

Figure 2:
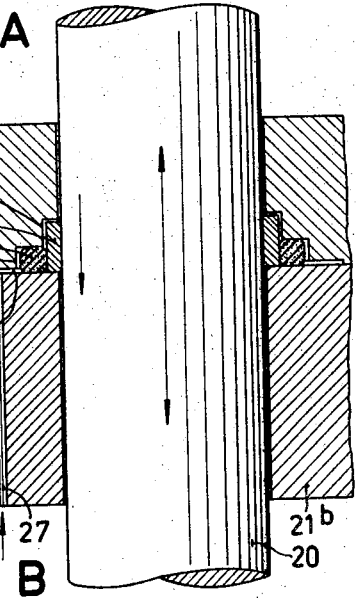

FIGURES 1 and 2 of the drawing show one embodiment of the invention, in which the sleeve associated with the sleeve support serves as a fluid arrester. It is the intention to keep the space above the sleeve as far as possible free of fluid. The embodiments shown in FIGURES 1 and 2 differ from each other inasmuch as in the embodiment shown in FIGURE 1 the complex of forces applied to a zone located asymmetrically to the longitudinal dimension of the sleeve is produced by springs. In the embodiment shown in FIGURE 2 this complex of forces is exerted by gas pressure.

Figure 3:
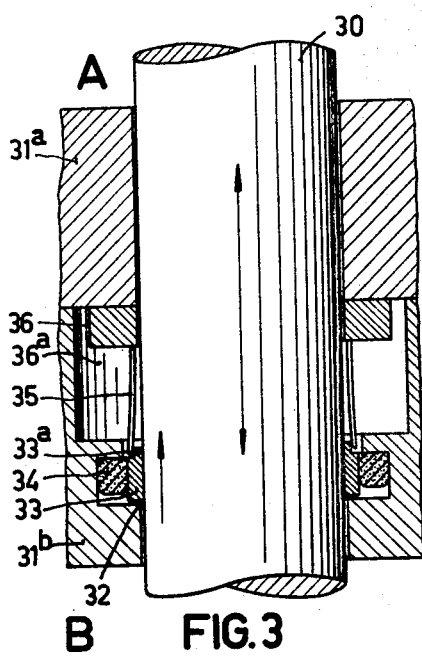
Figure 4:
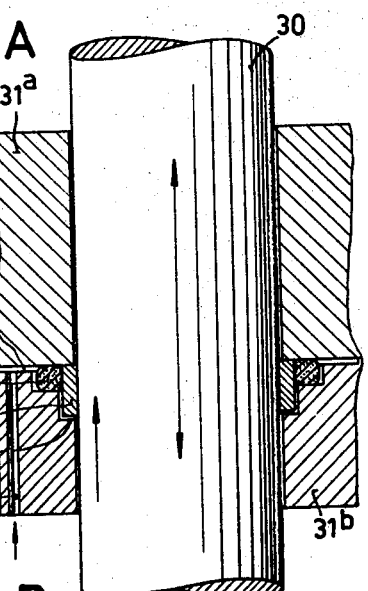

In the embodiment shown in FIGURES 3 and 4 the complex of forces acting asymmetrically to the longitudinal dimension of the sleeve applies to the top end of the sleeve. In the embodiment shown in FIGURE 3 the resilient action is exerted by a spring system and in that shown in FIGURE 4 by a pressure of a medium. Otherwise these embodiments are similar in principle. It is supposed that the space underneath the sleeve contains fluid; then fluid will be conveyed from bottom to top in these embodiments between the facing surfaces of the stationary sleeve and of the rod adapted to move up and down therein, in spite of the fact that these surfaces of the sleeve and of the rod engage each other without any play in the rest position. This oil conveyance will also take place, when a materially higher gas pressure prevails, more above the sleeve than underneath the sleeve.

The embodiments shown in FIGURES 5 and 6 differ structurally from each other only to an extent such that in the embodiment shown in FIGURE 5 the complex of forces acting asymmetrically upon the sleeve is produced by a spring structure and in that of FIGURE 6 by the pressure of a medium. In these embodiments not one but two sleeves, located one after the other are provided in the direction of movement of the rod. By the choice of the area of application of these complexes of forces on the sleeves it can be ensured that in both embodiments fluid can be conveyed towards the space located in between the two sleeves from both sides, so that the topmost sleeve serves as a fluid arrester for the space above the sleeve and the lowermost sleeve serves as a fluid pump acting in upward direction. Due to this effect a high-pressure fluid stop is obtained in these embodiments in the said intermediate space, so that high-pressure gas is prevented from leaking away out of the space above the sleeves, when the mechanism is inoperative.

In the embodiment of the invention shown in FIGURE 1 reference numeral 10 designates the reciprocating rod, which is adapted to move in the sleeve support consisting of the halves 11a and 11b. This support thus constitutes the so-called first element and supports the sleeve 15. The rod 10 constitutes the second element. The latter moves with a certain amount of play in the half 11b of the sleeve support. In a cavity 16 of the half 11a of the sleeve support is arranged the white-metal sleeve 15, of which the inner surface engages without play the surface of the rod 10. This sleeve 15 has a length $l$, in the direction of movement of the rod 10, which length is in this case about five times the thickness $d$ of the sleeve. The space between the outer side of the substantially cylindrical sleeve and the inner side of the cavity 16 is filled out substantially completely by an elastic O-shaped ring 17. The rod 10 is surrounded by a further cavity 12, in the lower part of which is mounted a ring 13 by means (not shown), which ring surrounds the rod 10 with a certain amount of play. This ring 13 supports a plurality of axially comparatively rigid resilient fingers 14. The top ends 14a of these resilient fingers bear on a thinned, cylindrical portion 15b of the sleeve 15. It is supposed that the space A above the sleeve 15 contains a gas under a pressure of, for example, 100 atmospheres, whereas the space B underneath the sleeve 15 contains a gas under a pressure of 1 atmosphere and fluid, for example lubricating oil. It is evident from FIGURE 1 that a gap-shaped space 18 is provided above the sleeve, this space constituting an open communication between the space A and the cavity 16. Only at the place of the sleeve 15 a complete closure is obtained in the rest position between the spaces A and B due to the sleeve 15, which bears on the rod 10 without play.

In the embodiment shown, when the rod stands still, two complexes or systems of forces directed radially to the inner side are exerted on this sleeve 15. One complex emanates from the high gas pressure in the space A, which pressure propagates through the gap 18 towards the cavity 16 and is distributed uniformly, also owing to the provision of the elastic O-shaped ring 17, over that part of the length of the sleeve 15 which is located straight opposite the height of the cavity 16. Apart therefrom the resilient fingers 14 exert on the end 15b of the sleeve 15 a force. The two complexes of forces are proportioned relatively to each other so that the pressure exerted by the fingers 14 on the sleeve exceeds that exerted on the further part of the sleeve by the gas pressure from the space A. It is always necessary to oppose the axial force due to gas or oil pressure as well as friction by means of the fingers 14. The force of fingers 14 also produces a close fit of the sealing unit axially while permitting a slight movement in a radial direction.

The inevitable cavities in the surface of the rod 10 contain furthermore lubricating oil. In spite of the fact that the sleeve 15 engages the surface of the rod 10 without play, the lubricating oil is capable of moving along the inner side of the sleeve 15 during the upward stroke of the rod. The conditions are different, however, when the rod moves downwards. If oil is present above the sleeve 15 on the surface of the rod 10, this oil is subjected due to the produced pressure to so high a pressure that the sleeve 15 is deformed so that it deflects slightly to the outside. However, as stated above, this sleeve is subjected to two complexes of forces orientated radially to the inner side, the sleeve being urged most strongly at the place of the thinned portion 15b by the prevailing complex of forces. The formation of the pressure in the oil during the downward stroke of the rod results in that between the surface of the rod and the inner side of the sleeve a very narrow gap of wedge-shaped section is formed, which tapers towards the bottom. From hydraulics it is known that in such a wedge a pump action is exerted on the fluid orientated towards the narrowest side of the wedge. In the present case this pump action results in the conveyance of fluid from above the sleeve 15 along the inner surface of this sleeve towards the space underneath this sleeve. Due to the application of the complex of forces emanating from the springs 14 to the lower end of the sleeve, there is substantially no possibility that such a wedge should be formed during the upward stroke of the rod. Consequently, this pump action occurs only from top to bottom. In the situation substantially no oil transport along the sleeve 15 will occur during the upward stroke of the rod. If fluid is found in the space above the sleeve 15, a downward pump action will occur during the downward stroke of the rod. This is due to the resilient deformation of the material of the sleeve 15. In practice this means that the sleeve 15 serves as an oil arrester from bottom to top. The same effects occur in the same directions in the embodiment of the invention shown in FIGURE 2. The rod 20 extends through the sleeve support consisting of two halves 21a and 21b, which surround the rod with a small amount of play. In a cavity 22 in the half 21a is accommodated a substantially cylindrical sleeve 23, of which the length is about five times the thickness thereof and of which the inner side engages the surface of the rod without play in the rest position of the device. The space between the rear side of the sleeve 23 and the wall 25 of the cavity 22 is filled out by an elastic O-shaped ring 24. In the space A prevails a high gas pressure, but in the space B prevails a low gas pressure, while oil is contained in the latter space. To the sleeve 23 apply two complexes of forces which are orientated radially to the inner side. One of these complexes emanates from the gas pressure in the space A, which pressure is propagated through the gap between the sleeve support half 21a and the rod 20 to behind the sleeve 23. The other complex of forces which applies asymmetrically to the sleeve 23 emanates from the pressure of a medium, which is exerted via a channel 27 and a transverse channel on the sleeve 23 and particularly on its lower end. As in the embodiment shown in FIGURE 1 this combination constitutes a fluid arrester from bottom to top.

Not only in the embodiment shown in FIGURE 3 but also in that shown in FIGURE 4 a rod 30 is adapted to move back and forth through a sleeve support consisting of two portions 31a and 31b. In a cavity 32 of the sleeve support half 31b is accommodated a sleeve 33 of rectangular cross section, of which the ratio between length and thickness is approximately 6:1; at the rear end this sleeve is supported from an elastic O-shaped ring 34. The sleeve 33 is made from white metal and engages with its inner surface without play the outer surface of the rod 30. In both embodiments the sleeve 33 is subjected to a complex of forces asymmetrically to its longitudinal dimension. In the embodiment shown in FIGURE 3 the complex of forces emanates from a plurality of rigid springs 35, which engage a thinned portion 33a of the sleeve 33. These springs are mounted on a ring 36, which is fastened in a further cavity 36a to the top part thereof by means (not shown). In the embodiments shown in FIGURE 4 the pressure of a medium passing through the ducts 47 and 48 is exerted on a place located asymmetrically to the longitudinal direction of the sleeve in a radial direction towards the interior. In these embodiments the sleeve 33 will be elastically deformed and allow oil to pass upwardly during the upward stroke of the rod between the facing surfaces of the sleeve 33 and the rod 30 under the action of the pressure produced in the fluid in the wedge-shaped gap formed between the outer surface of the rod 30 and the inner surface of the sleeve 33. During the backward stroke of the rod 30 the sleeve 33 cannot be deformed at all or can be deformed only to a small extent due to the force exerted on the top end of the sleeve 33 by the springs 35 in the embodiment shown in FIGURE 3 and by the pressure of the medium supplied via the duct 48 in the embodiment of FIGURE 4. During the downward stroke of the rod the sleeve 33 thus operates as a fluid arrester.

If in the space A above the sleeve 33, a materially higher gas pressure prevails than in the space B underneath the sleeve 33, fluid will also in this case be conveyed, against the action of the pressure in the space A, from the space B towards the space A. Consequently, in this case the sleeve 33 co-operates with the rod 30 to form a fluid pump operating in upward direction.

In the embodiments shown in FIGURES 5 and 6 a rod 50 is adapted to move through a sleeve support consisting of two portions 51a and 51b. In the direction of movement of the rod through this sleeve support two combinations according to the invention are arranged one after the other in these embodiments. The sleeve associated with the first combination is designated in both figures by 52. It is made from white metal and engages the rod 50 without play. Behind this sleeve an O-shaped ring 53 is provided. In both embodiments a force is exerted on the lower, thinned portion of this sleeve, which force is directed towards the interior. As is shown in FIGURE 5 this force is produced by a plurality of springs 54, which are supported from a ring 55. In the embodiment shown in FIGURE 6 the force is produced by the pressure of a medium acting on the lower end of the sleeve 52 via the duct 66 and the transverse duct 66a in the guide.

The second sleeve forming part of the second combination used is designated by 57 and is made also in this case from white metal and surrounds the rod 50 without play. Also in this case an O-shaped ring 58 is arranged behind this sleeve. In the embodiment shown in FIGURE 5 the force applied asymmetrically to the sleeve is provided by a plurality of springs 59, supported also from the aforesaid ring 55. This force is exerted on the top end of the sleeve 57. In the embodiment shown in FIGURE 6 the force exerted on the top end of the sleeve 57 emanates from the same pressure of the medium as that exerted on the lower end of the sleeve 52; to this end the duct 66 in the guide is provided with a second transverse duct 66b. In the embodiments shown in FIGURES 5 and 6 not only the space A above the sleeve 52 and the space B underneath the sleeve 57 but also a third space C is provided, which is located between the two sleeves 52 and 57. The sectional area of the sleeves employed has a length of about five times the thickness.

After the explanation given with reference to the preceding figures it will be obvious that, if one of the two spaces A and B contains a fluid, for example oil, the sleeve 52 exerts a pumping action on the fluid in downward direction and the sleeve 57 exerts a pumping action on the fluid in upward direction, irrespective of the pressures prevailing in the spaces A and B, and this during the downward stroke and the upward stroke of the rod 50 respectively. This results in that the space C is constantly filled with fluid and remains filled, even when the rod 50 is stationary. The sleeve 52 is operative as a fluid arrester in upward direction and the sleeve 57 operates as a fluid arrester in downward direction. If desired, the space C may be provided with a spring-controlled safety valve 71, shown diagrammatically, in order to prevent an excessive increase in the oil pressure in the space C.

The device described may be used, for example, when a high gas pressure prevails in the space A and a low gas pressure prevails in the space B. The space A may, for example, be the working space of a thermo-dynamic engine and the space B may be the crankshaft casing of this engine, which casing contains, moreover, oil. The construction described permits of avoiding, during the operation of the device, that lubricating oil finds its way into the space A, whereas in the rest position of the machine the oil-filled space C serves as a fluid arrester preventing the gaseous medium from leaking away from the high-pressure space A towards the low-pressure space B.

In order to minimize wear of the co-operating surfaces of the sleeves and of the rods, it is desirable to choose different degrees of hardness of the surfaces of these parts. The sleeve, which is replaced comparatively easily, will preferably be made from a softer material than the rod. In the embodiments described the sleeves are made from white metal. However, use may be made of steel sleeves. If desired, the sleeve may be provided with lining, for example, of a synthetic substance such as nylon. During the design of the minimum measures of the sleeve prescribed according to the invention the longitudinal section of the lining, if any, is considered to form part of the longitudinal section of the sleeve. In order to obtain the desired absence of play between the sleeve and the rod, the sleeve may be fitted by a slight pressure to the rod during the mounting operation.

It is furthermore very important, in order to obtain a thin fluid film between the facing surfaces of the sleeve and the rod and particularly to minimize the wear, to reduce the unevennesses of the two surfaces as far as possible. The surfaces concerned may be machined, for example, by fine-grinding, superfine-grinding or honing.

What is claimed is:

1. A fluid-tight seal between two spaces of different gas pressures having a scraping action in one direction comprising the combination of two coaxially arranged elements constituting a sleeve support and a rod reciprocating relative to each other, a sleeve having a cross-sectional length of at least three times its cross-sectional width, said sleeve support having a first cavity therein, said sleeve support holding said sleeve in said first cavity, said sleeve engaging a portion of the surface of said rod without play, at least one elastic ring in said first cavity exerting pressure on the side of the sleeve remote from the side adjacent to the rod, said sleeve being constituted of a metal having an inner lining of an organic material, said sleeve support being provided with a second cavity, a ring in said second cavity having a plurality of projecting, slightly resilient fingers, the free ends of said fingers bearing on said sleeve in a manner to create a force on said sleeve and directed towards said rod, said sleeve being subjected to another force directed radially inwardly toward said rod, said two forces being so proportioned that under the action of a pressure produced in the fluid between the facing surfaces of said rod and said sleeve the latter is elastically deformed against the action of said forces applied thereto and oriented toward said rod.

2. A fluid-tight seal as claimed in claim 1 wherein said other force is caused by the introduction of high gas pressure from one of said spaces.

3. A fluid-tight seal having a scraping action in one direction comprising the combination of two coaxially arranged elements constituting a sleeve support and a rod reciprocating relative to each other, a pair of sleeves each having a cross-sectional length of at least three times its cross-sectional width, said sleeve support having two spaced cavities therein, said sleeve support holding each sleeve in its respective cavity, said sleeves engaging a portion of the surface of said rod without play, and at least one elastic ring in each of said cavities exerting pressure on the side of said sleeve remote from the side adjacent to said rod, each of said sleeves being constituted of a metal having an inner lining of an organic material, said sleeves being subjected to forces directed radially inwardly towards said rod, said forces being so proportioned that under the action of a pressure produced in the fluid between the facing surfaces of said rod and said sleeves the latter is elastically deformed against the action of said forces applied thereto and oriented toward said rod, a chamber located between and communicating with said cavities whereby one of said sleeves exerts a scraping action on said liquid in an upward direction into said chamber and the other of said sleeves exerts a scraping action on the liquid in a downward direction into said chamber.

4. A fluid-tight seal between two spaces of different gas pressures having a scraping action in one direction comprising the combination of two coaxially arranged elements constituting a sleeve support and a rod reciprocating relative to each other, a pair of sleeves each having a cross-sectional length of at least three times its cross-sectional width, said sleeve support having spaced cavities therein, said sleeve support holding said sleeves in corresponding cavities, said sleeves engaging a portion of the surface of said rod without play, at least one elastic ring in each cavity exerting pressure on the side of the sleeve remote from the side adjacent to the rod, said sleeves being constituted of a metal having an inner lining of an organic material, said sleeve support being provided with a chamber between said spaced cavities and in communication therewith, a ring in said chamber having a plurality of projecting, slightly resilient fingers, the free ends of said fingers bearing on each of said sleeves in a manner to create a force on the respective sleeve directed toward said rod, each of said sleeves being subjected to another force directed radially inwardly toward said rod, said two forces being so proportioned that under the action of a pressure produced in the fluid between the facing surfaces of said rod and each of said sleeves the latter is elastically deformed against the action of said forces applied thereto and oriented toward said rod, one of said sleeves exerting a pumping action on the liquid in an upward direction into said chamber while the other of said sleeves exerts a pumping action on the liquid into said chamber.

References Cited in the file of this patent

UNITED STATES PATENTS

| Re. 24,440 | Groen | Mar. 4, 1958 |
| 2,732,268 | Duval | Jan. 24, 1956 |
| 2,772,900 | Campbell | Dec. 4, 1956 |
| 2,807,511 | Fleming | Sept. 24, 1957 |
| 2,825,590 | Sutherland | Mar. 4, 1958 |
| 2,877,070 | Lee | Mar. 10, 1959 |
| 2,892,645 | Tydeman | June 30, 1959 |
| 3,033,578 | Kellogg | May 8, 1962 |

FOREIGN PATENTS

| 704,117 | Great Britain | Feb. 17, 1954 |

UNITED STATES PATENT OFFICE
CERTIFICATE OF CORRECTION

Patent No. 3,149,846                        September 22, 1964

Hendrik Jozef Verbeek

It is hereby certified that error appears in the above numbered patent requiring correction and that the said Letters Patent should read as corrected below.

Column 2, line 6, before "complex" insert -- fluid film acted upon by the aforesaid asymmetrical --.

Signed and sealed this 9th day of March 1965.

(SEAL)
Attest:

ERNEST W. SWIDER
Attesting Officer

EDWARD J. BRENNER
Commissioner of Patents